United States Patent
Rozier et al.

(10) Patent No.: US 6,600,423 B1
(45) Date of Patent: Jul. 29, 2003

(54) SYSTEMS AND METHODS FOR REMOTELY CONTROLLING A CABLE PRESSURE MONITORING UNIT

(75) Inventors: Ronnie L. Rozier, Lithonia, GA (US); Philip B. Ashcraft, Cumming, GA (US); Steven W. Smith, Columbus, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 50 days.

(21) Appl. No.: 09/974,127

(22) Filed: Oct. 8, 2001

(51) Int. Cl.$^7$ ............................................... G08B 21/00
(52) U.S. Cl. ................ 340/611; 340/870.01; 379/32.01
(58) Field of Search .................................. 340/611, 614, 340/870.01, 870.16; 379/1.01, 22.03, 32.01, 32.02

(56) References Cited

U.S. PATENT DOCUMENTS

| | | | | |
|---|---|---|---|---|
| 3,598,930 A | * | 8/1971 | Desnoes | 379/33 |
| 3,944,914 A | * | 3/1976 | Simmonds | 384/539 |
| 4,480,251 A | * | 10/1984 | McNaughton et al. | 340/604 |
| 4,570,037 A | * | 2/1986 | Baker | 379/32.04 |
| 4,675,896 A | * | 6/1987 | Young | 379/32.01 |
| 4,728,948 A | * | 3/1988 | Fields | 340/3.71 |
| 4,764,232 A | * | 8/1988 | Hunter | 156/48 |
| 4,778,248 A | * | 10/1988 | Arzur et al. | 385/12 |
| 4,872,007 A | * | 10/1989 | Monterosso et al. | 340/870.01 |

\* cited by examiner

*Primary Examiner*—Toan Pham
(74) *Attorney, Agent, or Firm*—Merchant & Gould

(57) ABSTRACT

Systems and methods for remotely starting a cable pressure monitoring unit operable for monitoring the air pressure within a pressurized cable route, such as a telecommunications cable route, including a remote computer operable for generating and transmitting a command signal directing the cable pressure monitoring unit to start, an automated transfer system operable for receiving the command signal directing the cable pressure monitoring unit to start, and a computer network operable for communicating the command signal from the remote computer to the automated transfer system. The systems and methods also including a cable pressure monitoring unit start module disposed within the automated transfer system operable for generating and transmitting an operation signal directing the cable pressure monitoring unit to start, a relay operable for receiving the operation signal directing the cable pressure monitoring unit to start and starting the cable pressure monitoring unit, and a plurality of wires operable for communicating the operation signal from the cable pressure monitoring unit start module to the relay.

29 Claims, 2 Drawing Sheets

SYSTEMS AND METHODS FOR REMOTELY CONTROLLING A CABLE PRESSURE MONITORING UNIT

FIELD OF THE INVENTION

The present invention relates generally to systems and methods for remotely controlling a cable pressure monitoring unit and, more specifically, to systems and methods for remotely starting or restarting a cable pressure monitoring unit operable for monitoring the air pressure within a pressurized cable route, such as a telecommunications cable route.

BACKGROUND

Each year, telecommunications companies spend large amounts of money pumping air into their cables and pipes which carry and enable the transmission of voice and data information. This low-humidity air creates positive pressure in the cables, enabling them to resist standing water, moisture damage, and the like. Such standing water and moisture damage may lead to noise on the line, data transmission errors, and, ultimately, complete cable failure.

The cables which make up a telecommunications network typically include a sheath made of a water-resistant or waterproof material, such as lead or polyethylene. These sheaths typically encompass wires, such as copper wires, and an insulation material which separates individual conductor pairs. This insulation material may be, for example, paper, pulp, or plastic.

Exposure of the interior of a cable to water or moisture may lead to a number of problems. For example, exposure of the interior of a cable to moisture may destroy the insulating characteristics of the paper or pulp. If cracks develop in the sheath of a cable or the sheath of a cable is sliced, water may enter the cable and electrolysis may occur, resulting in faulted conductor pairs. Thus, the basic premise of cable pressurization is to keep the pressure within a cable in excess of the pressure which could be exerted by standing water. To this end, telecommunications companies and related industry associations have established minimum air pressure standards for underground, direct-buried, and aerial cables. For example, a minimum air pressure of six (6) pounds per square inch (PSI) may be required for underground cables, a minimum air pressure of three (3) PSI may be required for direct-buried cables, and a minimum air pressure of one (1) PSI may be required for aerial cables, as they are less at risk from water damage.

The air pumped into pressurized telecommunications cables originates from a plurality of air compressors, typically located in a company's "central offices" or wire centers. These air compressors are preferably coupled with dryers or dehumidifiers operable for removing residual moisture from the air. Thus, the air compressors act as compression dehydrators. Because a pressurized cable route may include a plurality of discrete sections of cable, each potentially thousands of feet long, the air pressure in each cable route tends to decrease as the distance from a central office, and a given air compressor, increases. This pressure drop is due, in part, to the presence of inevitable leaks in the route. Therefore, air pressure is typically re-established along a cable route by running an air pipe along the route and introducing air at a plurality of fixed points. The air pipe is connected to a plurality of manifolds which distribute air to the cables at, for example, each utility hole, making these connections relatively easy to maintain.

In order to maintain a pressurized cable route, a plurality of air pressure monitoring devices are placed at strategic points along the route (for example, at each air compressor or at each manifold). These air pressure monitoring devices typically include standard pressure transducers which utilize variations in electrical resistance to detect changes in air pressure. The air pressure monitoring devices measure the amount of air compression provided by a given air compressor or within a given cable volume at a given time in PSI. The air pressure monitoring devices are linked to control panels and/or cable pressure monitoring units in the various central offices or in a management facility so that readings may be taken by maintenance technicians at predetermined times. If the air pressure for a given air pressure monitoring device drops below a predetermined value, an air pressure alarm is tripped. A maintenance technician may then be dispatched to repair the affected air compressor, cable, air pipe, manifold, and the like.

One problem faced by telecommunications companies is that their air compressors and their cable pressure monitoring units may lock-up or shut down due to power fluctuations caused by generator problems or tests, lightning strikes, corrupted databases, and the like. In such cases, the air compressors are typically remotely restarted. Each air compressor is operatively connected to an automated transfer system (ATS), including a microprocessor and software operable for turning-off and turning-on the air compressor in succession. The ATS is typically accessible from a networked computer. In order to restart the cable pressure monitoring units, however, a maintenance technician must be dispatched to perform a manual restart. In a case such as a storm, access to a given cable pressure monitoring unit may be limited and a maintenance technician's safety may be compromised. Additionally, given a plurality of cable pressure monitoring unit failures during a given period of time and the high cost of maintenance technician time, such manual restarts may be expensive in the aggregate. Thus, what is needed are systems and methods for remotely starting or restarting a cable

BRIEF SUMMARY

The present invention provides systems and methods for remotely starting or restarting a cable pressure monitoring unit operable for monitoring the air pressure within a pressurized cable route, such as a telecommunications cable route.

In one embodiment, a system for remotely starting a cable pressure monitoring unit includes a remote computer operable for generating and transmitting a command signal directing the cable pressure monitoring unit to start, an automated transfer system operable for receiving the command signal directing the cable pressure monitoring unit to start, and a computer network operable for communicating the command signal from the remote computer to the automated transfer system. The system also includes a cable pressure monitoring unit start module disposed within the automated transfer system operable for generating and transmitting an operation signal directing the cable pressure monitoring unit to start, a relay operable for receiving the operation signal directing the cable pressure monitoring unit to start and starting the cable pressure monitoring unit, and a plurality of wires operable for communicating the operation signal from the cable pressure monitoring unit start module to the relay.

In another embodiment, a method for remotely starting a cable pressure monitoring unit includes generating a command signal directing the cable pressure monitoring unit to start using a remote computer, communicating the command signal from the remote computer to an automated transfer system, and receiving the command signal using the automated transfer system. The method also includes generating an operation signal directing the cable pressure monitoring unit to start using a cable pressure monitoring unit start module disposed within the automated transfer system, communicating the operation signal from the cable pressure monitoring unit start module to a relay, receiving the operation signal using the relay, and starting the cable pressure monitoring unit.

Advantageously, the systems and methods of the present invention make it possible to remotely start or restart a cable pressure monitoring unit so that maintenance technicians do not have to be put at risk in the field performing manual starts or restarts and maintenance technician expenses may be saved.

DETAILED DESCRIPTION

Figure 1:
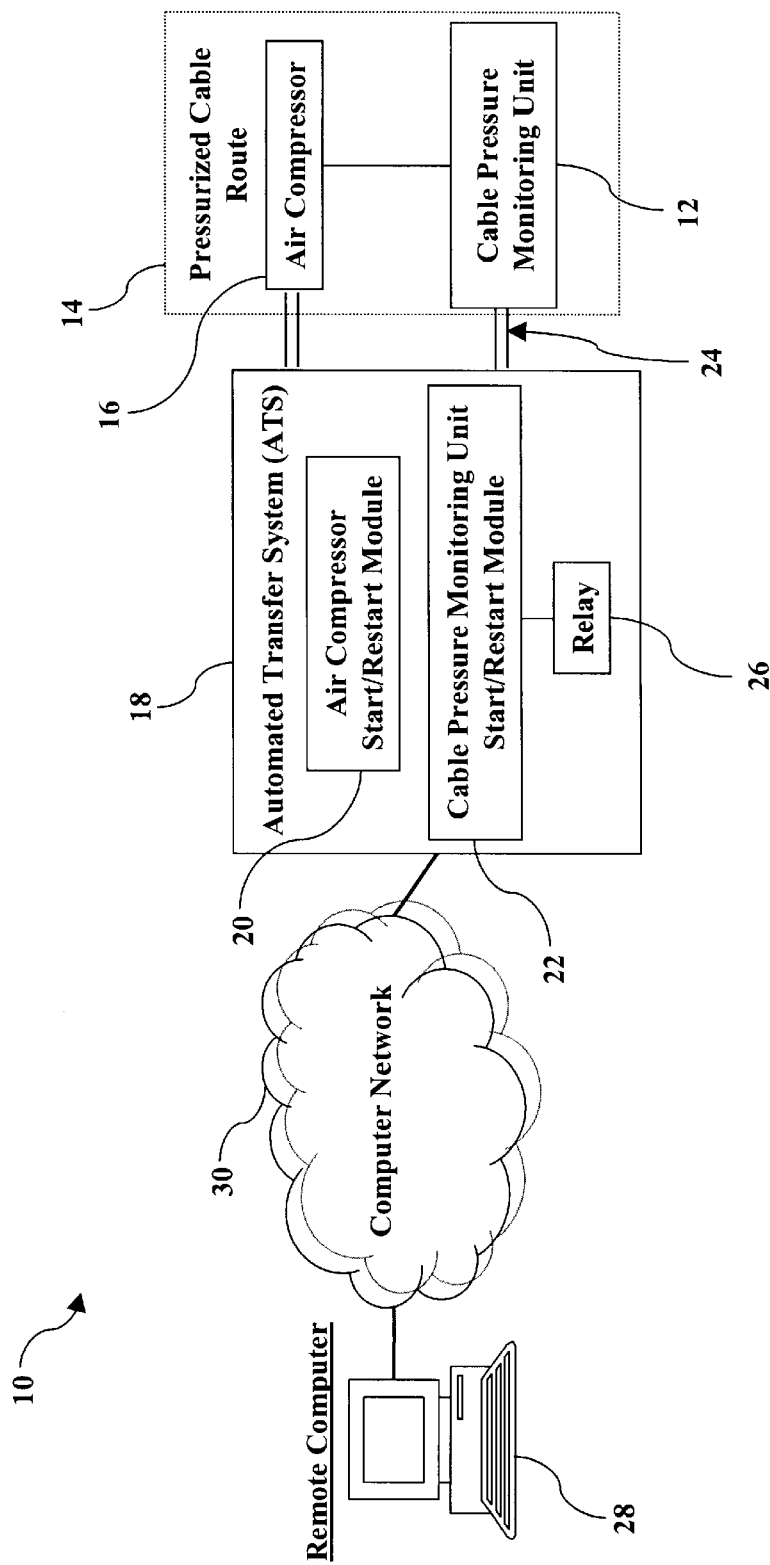
FIG. 1 is a schematic diagram of one embodiment of a system for remotely starting or restarting a cable pressure monitoring unit operable for monitoring the air pressure within a pressurized telecommunications cable route.

Embodiments of the present invention include systems and methods for controlling a cable pressure monitoring unit. Referring to FIG. 1, in one embodiment, a system 10 for remotely starting or restarting a cable pressure monitoring unit 12 operable for monitoring the air pressure within a pressurized telecommunications cable route 14 includes a cable pressure monitoring unit 12 operatively connected to an air compressor 16. The air compressor 16 is preferably coupled with a dryer or dehumidifier (not shown) operable for removing residual moisture from the air pumped into the pressurized cables by the air compressor 16. Thus, the air compressor 16 acts as a compression dehydrator. The pressurized cable route 14 preferably includes air pressure monitoring devices or standard pressure transducers which utilize variations in electrical resistance to detect changes in air pressure. These variations are monitored by control panels and/or cable pressure monitoring units 12 in the various central offices. The cable pressure monitoring unit 12 may be, for example, a Sparton Monitoring Unit (model 5300B Cable Pressure Monitoring and Control System, Sparton Technology, Inc., Jackson, Mich.). Both the air compressor 16 and the cable pressure monitoring unit 12 are operatively connected to an automated transfer system (ATS) 18. The ATS 18 includes a microprocessor and software operable for turning the air compressor 16 on, in the case of a start, and turning the air compressor 16 off and then on in succession, in the case of a restart. The ATS 18 may be, for example, an ATS-300 (Dielectric Communications, Inc., Bridgton, Me. (a subsidiary of SPX Corporation, Muskegon, Mich.)).

An air compressor start/restart module 20 and a cable pressure monitoring unit start/restart module 22 are disposed within the ATS 18. The air compressor start/restart module 20 is operable for starting or restarting the air compressor 16 in the event that it should lock-up or shut down due to a power fluctuation caused by a generator problem or test, a lightning strike, a corrupted database, and the like. The air compressor start/restart module 20 includes software or an algorithm operable for turning the air compressor 16 on, in the case of a start, and turning the air compressor 16 off and then on in succession, in the case of a restart.

Similarly, the cable pressure monitoring unit start/restart module 22 is operable for starting or restarting the cable pressure monitoring unit 12 in the event that it should lock-up or shut down. The cable pressure monitoring unit start/restart module 22 also includes software or an algorithm operable for turning the cable pressure monitoring unit 12 on, in the case of a start, and turning the cable pressure monitoring unit 12 off and then on in succession, in the case of a restart. The ATS 18 and the cable pressure monitoring unit start/restart module 22 are operatively connected to the cable pressure monitoring unit 12 by a pair of wires 24. A relay 26 disposed within the ATS 18 receives an operation signal from the ATS 18 and the cable pressure monitoring unit start/restart module 22 directing it to start or restart the cable pressure monitoring unit 12.

A maintenance technician or other individual may access the ATS 18 and the cable pressure monitoring unit start/restart module 22 via a remote computer 28 and a computer network 30. The remote computer 28 may be, for example, a personal digital assistant (PDA), a laptop computer, a personal computer (PC), a workstation, or a mainframe computer. The remote computer 28 preferably includes a processor and a memory device. The processor may be a microprocessor, such as that manufactured by Advanced Micro Devices, Inc. (Sunnyvale, Calif.), Intel Corporation (Santa Clara, Calif.), Motorola, Inc. (Schaumburg, Ill.), International Business Machines Corp. (Armonk, N.Y.), and Transmeta Corp. (Santa Clara, Calif.). The memory device may include a random-access memory (RAM) and a read-only memory (ROM), as well as other types of memory. The computer network 30 may be, for example, a local-area network (LAN), a wide-area network (WAN), a dedicated network, or a globally-distributed network, such as the Internet.

The remote computer 28 is used by a maintenance technician to generate a command signal which is communicated to the ATS 18 and the cable pressure monitoring unit start/restart module 22 by the computer network 30, directing the ATS 18 and the cable pressure monitoring unit start/restart module 22 to start or restart the cable pressure monitoring unit 12. Alternatively, the remote computer 28 may contain software or an algorithm operable for detecting when a given cable pressure monitoring unit 12 has locked-up or shut down and starting or restarting the cable pressure monitoring unit 12 automatically.

Figure 2:
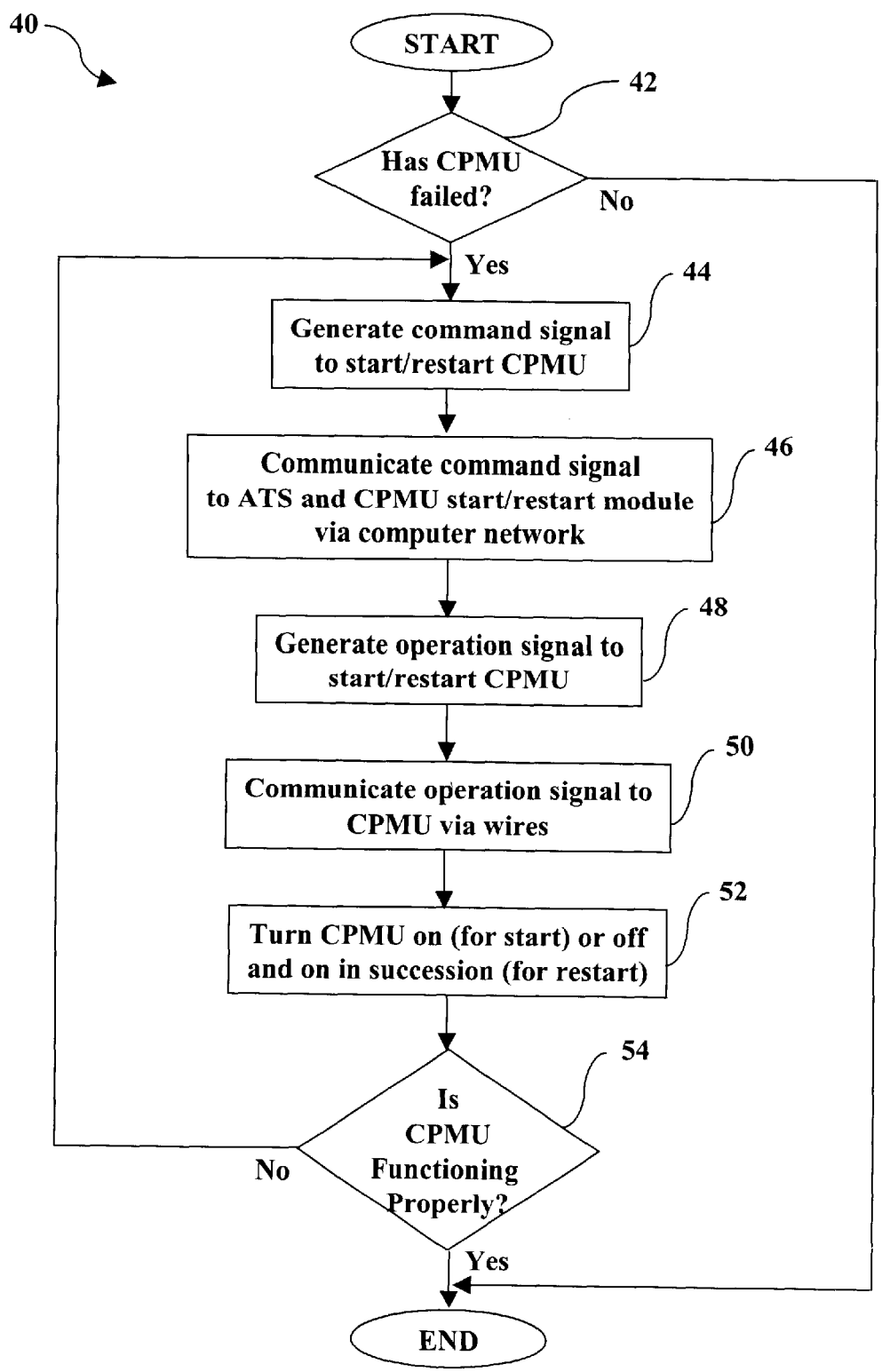
FIG. 2 is a flow chart of one embodiment of a method for remotely starting or restarting a cable pressure monitoring unit operable for monitoring the air pressure within a pressurized telecommunications cable route.

Referring to FIG. 2, in one embodiment, a method 40 for remotely starting or restarting a cable pressure monitoring unit 12 (FIG. 1) operable for monitoring the air pressure within a pressurized telecommunications cable route 14 (FIG. 1) includes a plurality of steps beginning with determining whether or not the cable pressure monitoring unit 12 (hereinafter referred to as the "CPMU") has failed, i.e. locked-up or shut down (Block 42). This information is communicated by the CPMU 12 to the remote computer 28 (FIG. 1), and displayed by the remote computer's graphical user interface (GUI). If the CPMU 12 has failed, a maintenance technician may generate a command signal, using the remote computer 28, directing the CPMU 12 to start or restart (Block 44). This command signal is communicated from the remote computer 28 to the cable pressure monitoring unit start/restart module 22 (FIG. 1) (hereinafter referred to as the "CPMU start/restart module") disposed within the ATS 18 (FIG. 1) via the computer network 30 (FIG. 1) (Block 46). As described above, the computer network 30 may be a LAN, a WAN, a dedicated network, or a globally-distributed network, such as the Internet (Block 46). The CPMU start/restart module 22 and the ATS 18 are then operable for generating an operation signal, directing the CPMU 12 to start or restart (Block 48). The operation signal is communicated from the CPMU start/restart module 22 and the ATS 18 to the CPMU 12 via a pair of wires 24 (FIG. 1) (Block 50). The CPMU 12 and the ATS 18 include a relay 26 (FIG. 1) operable for turning the CPMU 12 on, in the case of a start, and turning the CPMU 12 off and then on in succession, in the case of a restart (Block 52). The remote computer 28 is then operable for determining whether or not the CPMU 12 has resumed proper function (Block 54).

It is apparent that there has been provided, in accordance with the present invention, systems and methods for remotely controlling a cable pressure monitoring unit. While the present invention has been particularly shown and described in conjunction with examples and preferred embodiments thereof, it will be appreciated that variations in and modifications to the present invention may be effected by persons of ordinary skill in the art without departing from the spirit or scope of the invention. It is therefore to be understood that the principles described herein apply in a similar manner, where applicable, to all examples and preferred embodiments intended to be covered by the following claims.

What is claimed is:

1. A system for remotely starting a cable pressure monitoring unit operable for monitoring the air pressure within a pressurized cable route, the system comprising:
    an automated transfer system operable for receiving a command signal directing the cable pressure monitoring unit to start;
    a cable pressure monitoring unit start module disposed within the automated transfer system, the cable pressure monitoring unit start module operable for generating and transmitting an operation signal directing the cable pressure monitoring unit to start; and
    a relay device operable for receiving the operation signal directing the cable pressure monitoring unit to start and starting the cable pressure monitoring unit.

2. The system of claim 1, further comprising a remote computer operable for generating and transmitting the command signal directing the cable pressure monitoring unit to start.

3. The system of claim 2, further comprising a computer network operable for communicating the command signal from the remote computer to the automated transfer system.

4. The system of claim 3, wherein the computer network comprises a network selected from the group consisting of a local-area network, a wide-area network, a dedicated network, and a globally-accessible network.

5. The system of claim 1, further comprising a wire operable for communicating the operation signal from the cable pressure monitoring unit start module to the relay device.

6. The system of claim 1, wherein the automated transfer system comprises a microprocessor.

7. The system of claim 6, wherein the cable pressure monitoring unit start module comprises an algorithm disposed within the microprocessor.

8. The system of claim 1, wherein the command signal directing the cable pressure monitoring unit to start comprises a command signal directing the cable pressure monitoring unit to restart.

9. The system of claim 1, wherein the operation signal directing the cable pressure monitoring unit to start comprises an operation signal directing the cable pressure monitoring unit to restart.

10. The system of claim 9, wherein restarting the cable pressure monitoring unit comprises turning the cable pressure monitoring unit off and then on in succession.

11. The system of claim 1, wherein the cable route comprises a telecommunications cable route.

12. A system for remotely starting a cable pressure monitoring unit operable for monitoring the air pressure within a pressurized cable route, the system comprising:
    a remote computer operable for generating and transmitting a command signal directing the cable pressure monitoring unit to start;
    an automated transfer system operable for receiving the command signal directing the cable pressure monitoring unit to start;
    a computer network operable for communicating the command signal from the remote computer to the automated transfer system;
    a cable pressure monitoring unit start module disposed within the automated transfer system, the cable pressure monitoring unit start module operable for generating and transmitting an operation signal directing the cable pressure monitoring unit to start;
    a relay device operable for receiving the operation signal directing the cable pressure monitoring unit to start and starting the cable pressure monitoring unit; and
    a plurality of wires operable for communicating the operation signal from the cable pressure monitoring unit start module to the relay device.

13. The system of claim 12, wherein the automated transfer system comprises a microprocessor.

14. The system of claim 13, wherein the cable pressure monitoring unit start module comprises an algorithm disposed within the microprocessor.

15. The system of claim 12, wherein the computer network comprises a network selected from the group consisting of a local-area network, a wide-area network, a dedicated network, and a globally-accessible network.

16. The system of claim 12, wherein the command signal directing the cable pressure monitoring unit to start comprises a command signal directing the cable pressure monitoring unit to restart.

17. The system of claim 12, wherein the operation signal directing the cable pressure monitoring unit to start comprises an operation signal directing the cable pressure monitoring unit to restart.

18. The system of claim 17, wherein restarting the cable pressure monitoring unit comprises turning the cable pressure monitoring unit off and then on in succession.

19. The system of claim 12, wherein the cable route comprises a telecommunications cable route.

20. A method for remotely starting a cable pressure monitoring unit operable for monitoring the air pressure within a pressurized cable route, the method comprising:
    generating a command signal using a remote computer, the command signal directing the cable pressure monitoring unit to start;
    communicating the command signal from the remote computer to an automated transfer system;
    receiving the command signal using the automated transfer system;
    generating an operation signal using a cable pressure monitoring unit start module disposed within the automated transfer system, the operation signal directing the cable pressure monitoring unit to start;

communicating the operation signal from the cable pressure monitoring unit start module to a relay device;

receiving the operation signal using the relay device; and starting the cable pressure monitoring unit.

21. The method of claim 20, wherein communicating the command signal from the remote computer to the automated transfer system comprises communicating the command signal from the remote computer to the automated transfer system via a computer network.

22. The method of claim 21, wherein the computer network comprises a network selected from the group consisting of a local-area network, a wide-area network, a dedicated network, and a globally-accessible network.

23. The method of claim 20, wherein communicating the operation signal from the cable pressure monitoring unit start module to the relay device comprises communicating the operation signal from the cable pressure monitoring unit start module to the relay device via a plurality of wires.

24. The method of claim 20, wherein the automated transfer system comprises a microprocessor.

25. The method of claim 24, wherein the cable pressure monitoring unit start module comprises an algorithm disposed within the microprocessor.

26. The method of claim 20, wherein generating a command signal directing the cable pressure monitoring unit to start comprises generating a command signal directing the cable pressure monitoring unit to restart.

27. The method of claim 20, wherein generating an operation signal directing the cable pressure monitoring unit to start comprises generating an operation signal directing the cable pressure monitoring unit to restart.

28. The method of claim 27, wherein restarting the cable pressure monitoring unit comprises turning the cable pressure monitoring unit off and then on in succession.

29. The method of claim 20, wherein the cable route comprises a telecommunications cable route.

\* \* \* \* \*

UNITED STATES PATENT AND TRADEMARK OFFICE
CERTIFICATE OF CORRECTION

PATENT NO.     : 6,600,423 B1
DATED          : July 29, 2003
INVENTOR(S)    : Rozier et al.

It is certified that error appears in the above-identified patent and that said Letters Patent is hereby corrected as shown below:

Column 2,
Line 39, insert -- . -- after the word "cable".

Column 4,
Line 35, delete "Well" and insert -- well -- in place thereof.

Signed and Sealed this

Second Day of December, 2003

JAMES E. ROGAN
*Director of the United States Patent and Trademark Office*